United States Patent [19]

Spevack

[11] 3,872,223
[45] Mar. 18, 1975

[54] IMPROVEMENTS IN DUAL TEMPERATURE EXCHANGE PROCESS

[75] Inventor: Jerome S. Spevack, New Rochelle, N.Y.

[73] Assignee: Deuterium Corporation, White Plains, N.Y.

[22] Filed: Mar. 22, 1971

[21] Appl. No.: 126,623

[52] U.S. Cl. ............................. 423/580, 423/563
[51] Int. Cl. ............................................ C01b 5/02
[58] Field of Search ........................... 423/580, 563

[56] References Cited
UNITED STATES PATENTS
3,549,324  12/1970  Babcock ........................... 423/580
3,549,325  12/1970  Babcock ........................... 423/580
3,690,829  9/1972  Glew et al. ........................ 423/580

Primary Examiner—Earl C. Thomas
Attorney, Agent, or Firm—Hall & Houghton

[57] ABSTRACT

A dual temperature final enrichment system which, e.g. can effect the further enrichment of the previously augmented deuterium content of water from a concentration of 1 mol percent to a desired concentration of up to 99.8 mol percent; and a product finishing system which can remove dissolved contaminants from such enriched water to provide a high purity product.

13 Claims, 3 Drawing Figures

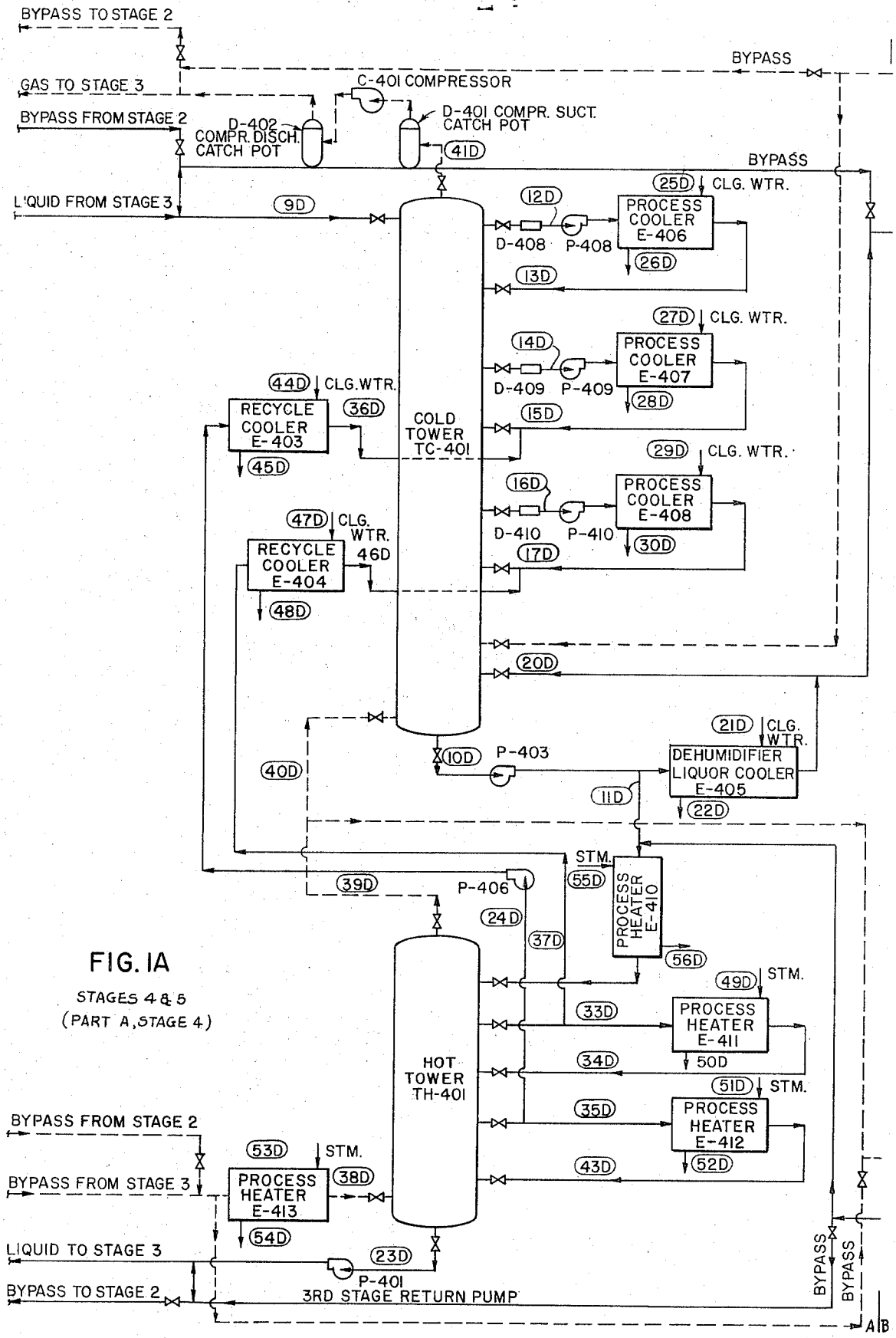
FIG. IA
STAGES 4 & 5
(PART A, STAGE 4)

STAGES 4 & 5
(PART B, STAGE 5)

PRODUCT FINISHING

IMPROVEMENTS IN DUAL TEMPERATURE EXCHANGE PROCESS

BACKGROUND OF THE INVENTION

1. Field of Invention

This application relates to improvements in dual temperature exchange systems for concentrating a desired material by exchanging, at different temperatures, said desired material with another material between chemically different lighter and heavier fluids which are physically separable from each other and which are each capable of containing each of said materials and is more particularly concerned with improvement of the final stages of a dual temperature waterhydrogen sulfide exchange system for the production of deuterium oxide (heavy water) and the product finishing stage thereof.

2. Description of the Prior Art

In such dual temperature exchange systems, for instance, as disclosed in my prior U.S. Pats. No. 2,787,526 issued Apr. 2, 1957; No. 2,895,803 issued July 21, 1959; and No. 3,142,540 issued July 28, 1964, a system is employed which comprises one or more stages of hot and cold tower pairs for contacting of said lighter and heavier fluids in countercurrent relationship. In such known systems one of the two fluids is supplied from an external source and is fed to the first tower of the first stage pair of towers, enriched in the desired material to be concentrated by preferential exchange therein, impoverished in the said desired material in the second tower of said pair to a concentration of the desired material less than that of said feed supply fluid, and discharged from the system. The other fluid is continuously circulated through the pair of towers to become enriched in the desired material in the second tower of said pair and to become impoverished in that material in the first tower of said pair. Such a system may comprise a plurality of similar or different concentrating stages of known species, and a portion of the flow of one or both the enriched fluids being passed between said towers in a stage other than the last is also impoverished in the desired material during such passage by subjecting it to extraction of desired material therefrom in the following stage or other concentrating treatment. A portion of the enriched flow of one of the fluids is withdrawn as product from that part of the system in which its concentration of the desired material is high.

Also, in such dual temperature exchange systems, as is shown by the above mentioned prior patents, various provisions are made for moving the process fluids and adjusting the temperatures thereof as required by the process, which employ fluid pumping means, heating and cooling means, and indirect and/or direct contact heat exchange means provided to meet the particular requirements of the system.

In the prior art, the practice in the production of heavy water has been to conduct the final stages of enrichment by water distillation and/or electrolysis. Statements have been made in the literature that the final enrichmentd operations might be carried out by the dual temperature exchange process, but such has not actually been performed.

SUMMARY OF THE INVENTION

The present invention aims to provide a dual temperature final enrichment system which can be used to enrich the deuterium content of water from a concentration of 1 mol percent or more to a desired final enrichment of up to 99.8 mol percent, as $D_2O$ (deuterium oxide), and to a product finishing system which can remove dissolved inorganic and/or organic contaminents to provide a pure product.

DESCRIPTION OF PREFERRED EMBODIMENTS

Figure 1B:
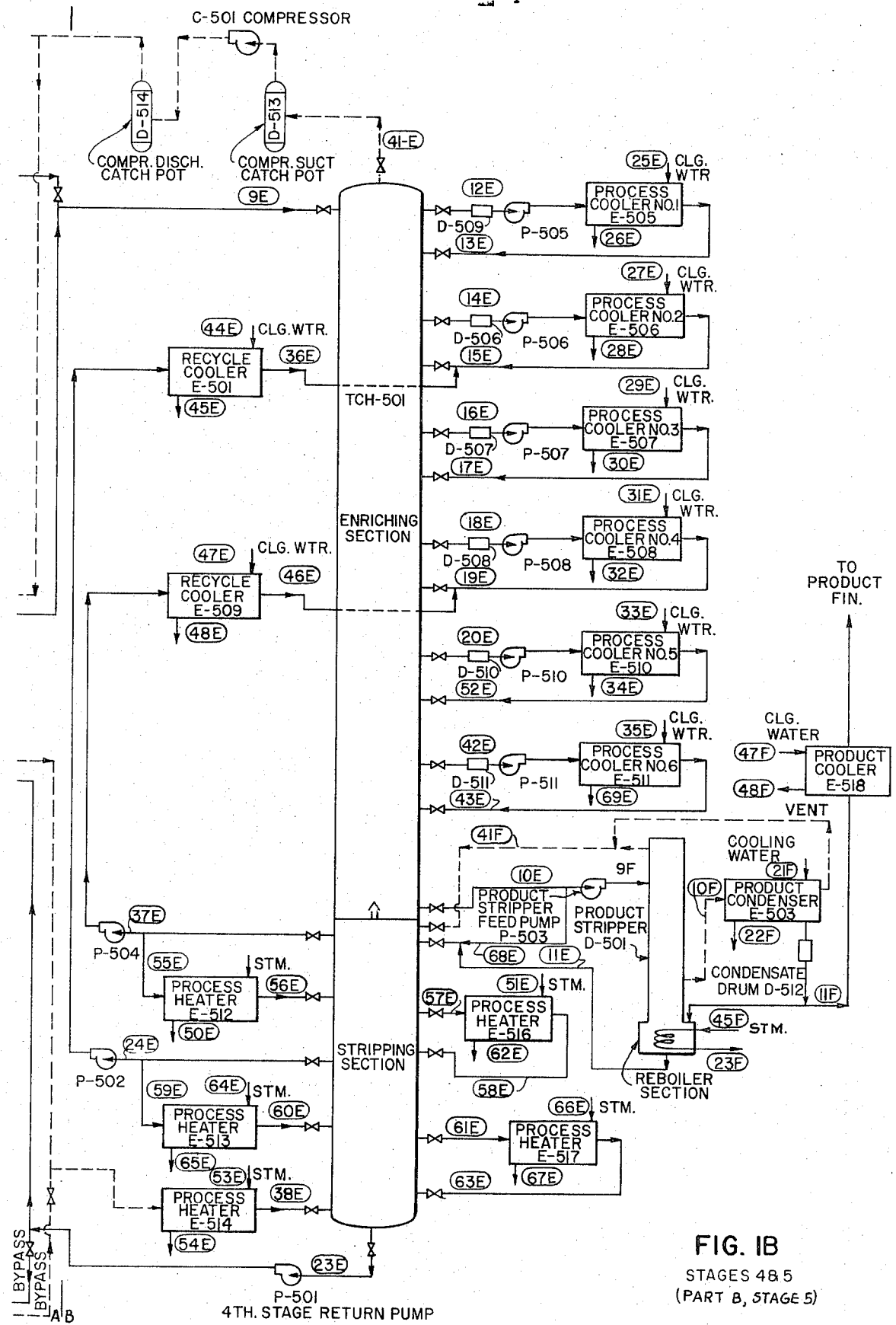
FIG. 1 (consisting of FIG. 1A and FIG. 1B) is a simplified flow diagram of a dual temperature final enrichment stage according to the invention.
Figure 2:
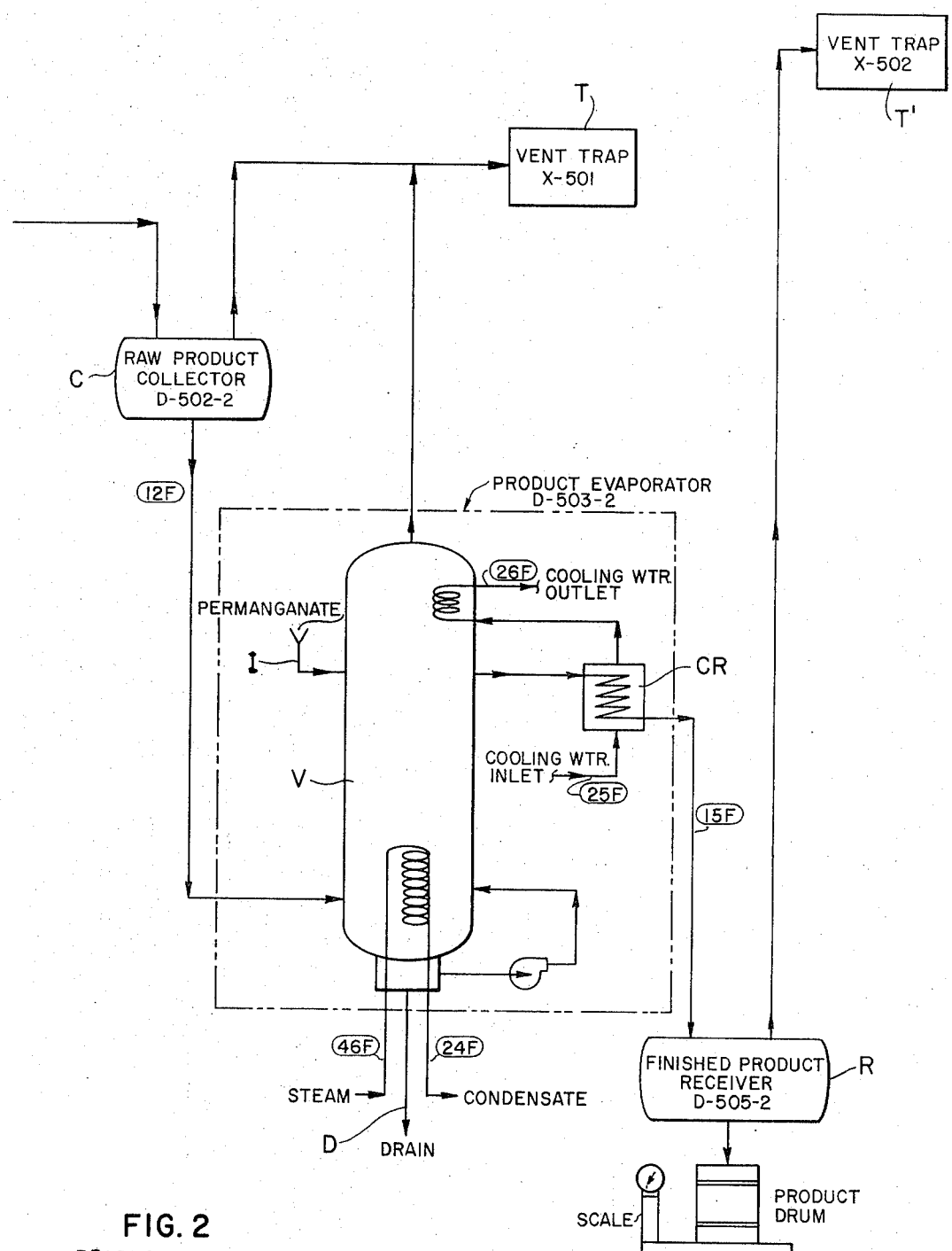
FIG. 2 is a modified flow diagram of a product finishing system suitable for employment therewith.

The embodiments shown in FIGS. 1 and 2 of the drawings is particularly adapted to receive water and hydrogen sulfide partially enriched in deuterium content by prior stages of a dual temperature exchange system, e.g. the three stage system described in my copending application Ser. No. 126,692 filed concurrently herewith, whereby enrichment to a concentration of deuterium from about 7 mol percent to 15 mol percent, as $D_2O$ is attained, and accordingly the stages of the preferred embodiment of FIG. 1 herein are designated as the fourth and fifth stages.

Referring to FIG. 1A of the accompanying drawings:

Stage 4 comprises a hot tower TH-401 and a cold tower TC-401 operating in conjunction with an $H_2S$ compressor C-401 and various process water pumps and process coolers and heaters substantially as shown.

The stage 4 hot tower is a vertical pressure vessel approximately 30 inches in diameter and approximately 121 feet high, consisting entirely of a water impoverishing section. The cold tower vessel is a vertical pressure vessel approximately 30 inches in diameter and approximately 140 feet high consisting of the cold tower or water enriching section and an integral dehumidification tower section thereunder extending below the inlet of pipe 20D. Both towers are made of carbon steel and contain stainless-steel sieve trays.

Due to the smaller flow volumes and greater concentration ranges in stage 4 as compared to prior enrichment stages of the dual temperature system, effects of isotopic heat given off in the exchange reactions, $H_2O + HDS \rightleftharpoons HDO + H_2S$ and $HDO + D_2S \rightleftharpoons D_2O + HDS$, become critical making it necessary to include exothermal coolers for the process fluids in the cold towers in the preferred practice of the present invention and heaters for the process fluids in the hot tower. Unlike the preceding stages, stage 4 does not include any heat recovery exchangers.

Deuterium-enriched $H_2S$ gas from the stage 3 hot towers is heated in the heater E-413 in conduit 38D and passed into the bottom of the stage 4 hot tower. The gas passes upward through the tower, stripping deuterium from the countercurrent flow of process water. The gas leaves the top of the hot tower 39D and is split into two streams, one of which flows via 38E to the bottom of the hot tower section of the stage 5 tower TCH-501 and the other, being the major stream enters the bottom of the stage 4 cold tower via 40D.

The $H_2S$ gas passes upward to the cold tower TC-401 through the dehumidification section in countercurrent direct contact with the circulation of cold water between 20D and 10D. The cooled, dehumidified gas passes through the cold tower water enriching section, transferring its deuterium to the countercurrent flow of process water therein. Gas recycled from stage 5 joins the main gas flow at the bottom of the cold tower just above 20D. The gas leaves the top of the cold tower via 41D and is pumped by the stage 4 gas compressor C-401 via 41D to the bottom of the stage 3 cold tower. Under circumstances of impaired 3rd stage operation, the gas flow is split into two streams with part passing to the stage 3 cold tower and the rest bypassed to the bottom of the stage 2 cold tower of the entire flow may be diverted to stage 2.

The deuterium-enriched process water from stage 3 via 9D is discharged into the top of the stage 4 cold tower where the water flows downward picking up deuterium from the countercurrent flow of $H_2S$ gas. The deuterium-enriched water then flows downward through the dehumidification section located thereunder, merging with the dehumidification water circulation from 20D. Condensate formed in the dehumidifier from the cooling of the gas becomes part of the water flow in the dehumidification section.

The process water flow in the cold tower is withdrawn at three separate enrichment levels and each of the three streams is pumped (by pumps P-408, P-409 and P-410 respectively) through a process cooler E-406, E-407 and E-408, respectively, from which the stream is returned via 13D, 15D and 17D to the tower immediately below the seal tray from which it was withdrawn. A level chamber 12D, 14D and 16D, on the intake side of each pump permits steady liquid flow to each process cooler and also prevents the pump from running dry. In addition, two separate water process water streams are recycled from different levels of impoverishment in the hot tower TH-401 and are merged with the stream of cooled process water reentering the cold tower of substantially similar deuterium concentration.

The deuterium-enriched process water from the cold tower TC-401 is withdrawn via 10D from the bottom of the dehumidification section thereunder. The flow, pumped by pump P-403 is split into two streams, one part is passed to a dehumidifier liquor cooler E-405 and recycled via 20D to the top of the dehumidification section and the other part after merging with process water returned via 23E from the bottom of the hot tower section of stage 5, is passed through heater E-410 from which the heated water enters the top of the hot tower TH-401. This enriched water flows downward across the sieve trays in the hot tower and is stripped of deuterium by the countercurrent flow of gas. The impoverished water is withdrawn via 23D from the bottom of the hot tower and returned by pump P-401 to the top of the stage 3 hot tower.

Process water flow in the hot tower is withdrawn at two separate levels of impoverishment in the tower. A portion via 37D of the upper or less impoverished stream passes to recycle cooler E-404 and via 46D is recycled to the cold tower and merged with the returning cooled cold tower water flow at 17D, and the rest passes via 33D through heater E411 and via 34D reenters the hot tower. A portion via 24D of the lower or more impoverished stream is pumped by the pump P-406 to the recycle cooler E-403 and via 36D is recycled to the cold tower and merged with the returning cooled cold tower water flow at 15D, and the remainder passes via 35D through heater E-403 and via 43D reenters the hot tower.

Process water passing down through the dehumidification section under the cold tower TC-401 is heated while cooling and dehumidifying the countercurrent flow of hot saturated $H_2S$ therein from the hot tower TH-401. The water, withdrawn via 10D from the bottom of the dehumidifier section, is pumped by pump P-403, in part to the dehumidifier recycle liquid cooler P-405 and a portion of the so called water is passed via 9E to the top of the cold tower enriching section of stage 5 tower TCH-501. The major part of the water pumped by P-403 is recycled to the cold tower dehumidification section. Referring to FIG. 1B of the accompanying drawing:

Stage 5 contains a single tower TCH-501 comprising the cold tower of enriching section on top of a dehumidification section which in turn is constructed on top of the hot tower or stripping section. This unit operates in conjunction with $H_2S$ compressor C-501 and various process water pumps, process fluid coolers and a product stripper, substantially as shown.

The stage 5 tower is a vertical pressure vessel made of stainless steel. It is approximately 30 inches in diameter and 120 feet high. High efficiency packing is used instead of sieve trays throughout the tower.

Deuterium enriched gas from the stage 4 hot tower, divided from the flow via 39D, is heated in heater E-514 and passed via 38E into the bottom of the hot water stripping section of the stage 5 tower. The gas passes upward therein becoming enriched while stripping deuterium from the countercurrent flow of process water. A flow of $H_2S$ gas, via 41F, from the product stripper D-501 joins the enriched gas at the top of the stripping section. The $H_2S$ gas passes from the hot water stripping section into the dehumidification section where it is cooled and dehumidified by the countercurrent flow of process water therein. The cooled enriched gas flows into the cold tower water enriching section and continues upward, transferring its deuterium to the descending process water. The impoverished $H_2S$ gas leaving the top of the tower via 41E is pumped by gas compressor C-501 into the bottom of the stage 4 cold tower.

Deuterium enriched process water from stage 4 enters the top of the stage 5 tower via 9E. The water flows downward in the cold enriching section, picking up deuterium from the countercurrent flow of deuterium enriched $H_2S$ gas. To counteract the heating effect of the exothermic deuterium exchange reaction in this section the warmed process water is withdrawn from the tower at six separate levels of enrichment, and each stream is pumped to a cooler, E-505 to E-511, and then returned to the tower. Level chambers, eg12E, on the inside side of each pump, e.g. R-505, permit steady water flow to each cooler and prevent the pumps from running dry. Two hot process water streams of different intermediate concentration are withdrawn from the stripping section, are separately cooled in coolers E-509 and E-501, respectively, and each is merged with the recycled cooled process water stream of corresponding concentration at the enrichment section, e.g. at 19E and 15E respectively.

Deuterium enriched process water is withdrawn via 10E from the bottom of the dehumidification section of tower TCH-501. A major portion via 68E is merged with a hot purge stream via 11E from the bottom of the reboiler section of the product stripper D-501 and passed into the top of the stage 5 tower stripping section. The remainder is passed via 9F by pump P-503 to the product stripper D-501 for removal of dissolved $H_2S$ and primary purification by distillation.

The enriched process water from the dehumidifier sections in the tower is passed downward through the stripping section where it transfers it deuterium to the countercurrent flow of $H_2S$ gas therein. To counteract the cooling effect of the endothermic exchange reaction in this section, the cooled process water is withdrawn from the tower at four separate levels of impoverishment. Each section is pumped e.g. by P-504 to a heater e.g. E-512, and then returned to the tower. A portion of each of two of the streams 37E and 24E, is pumped to a cooler, E-509 and E-501, respectively, and passed to the cold water enriching section and these merged with the entering recycle flow of the cooled process water of corresponding concentration, e.g. 15E and 19E respectively.

The product stripper D-501 is a stainless steel pressure vessel consisting of a reboiler section and hydrogen sulfide stripping section. The stripping section is packed with 1/2 inch Raschig rings.

Highly enriched process water comprising substantially pure $D_2O$ from the bottom of the dehumidification section is pumped to the top of the stripping section of the product stripper and $D_2S$ and/or HDS is removed as the water passes downward counter to the upward flow of water vapor therein. The vapor is generated in the reboiler section at the bottom of the unit by evaporation with heat supplied by a steam heated tubular coil therein. The enriched $H_2S$ stripped from the product together with $D_2O$ vapor are passed via 41E to the bottom of the dehumidification section. A liquid purge stream is withdrawn from the bottom of the reboiler section to prevent the buildup of soluble salts, and is returned via 11E to the top of the stripping section of the stage 5 tower. Deuterium oxide or heavy water vapor is withdrawn via 10F from below the packed stripping section and passed to the product condenser E-503.

A portion of the condensate of distilled heavy water withdrawn from the condenser is recycled to the reboiler section and the remainder is passed to a product cooler E-518 and then to the product finishing system. Uncondensed vapor and non-condensables are vented from the top of the condenser and are recycled with the enriched $H_2S$ from the stripping section of the product stripper via 41F to the stage 5 tower.

The purpose of the product finishing system is to purify the heavy water by distillation and chemical treatment so that it will meet the high-purity requirements. The system preferably consists of two identical sections installed in parallel, in that one may be available for stand-by. Each system in the form shown in FIG. 2 includes a raw product collector C, a product evaporator vessel V, and a finished product receiver R. A portable scale is used to weigh the finished product.

The distilled heavy water product from stage 5 continuously enters the system as the top of the stainless-steel raw product collector C. During the distillation operation, raw product passes to the product evaporator vessel. There is a 30 gallon stainless steel unit consisting of a lower evaporator section and an upper combined high-purity condenser section. A steam coil provides heat for distilling the raw product.

Heavy water vapor passes from the evaporator section at the lower part of vessel V to the high-purity condenser section at the upper part of vessel V where it is condensed. The product passes as vapor from the zone between said evaporator and condenser sections to the product cooler CR where it is condensed to a liquid, there being reflux and backwashing from the condensate formed in the upper condensing section of the vessel V. The cooled product is passed through a conductivity cell in line 15F (cell not shown) which monitors its purity; a product with higher electrolyte concentration than is desired is returned to the evaporator section by suitable means (not shown).

Potassium permanganate is added via inlet I at the top of the evaporator section to oxidze any organic matter or other oxidizable contaminants carried over in the vapor phase via 10F (FIG. 1B) or otherwise gaining acess to the vessel V. The spent permanganate is periodically removed via a drain connection D.

The concentrated product is withdrawn into the finished product receiver. It is periodically discharged into product drums and weighed. The collector C and vessel V and receiver R are vented to refrigerated traps T and T' to prevent loss of valuable heavy water vapor.

By the term "physically separable substances" here and elsewhere in the specification is meant substances which are actually in separate phases at the time of the exchange reaction (e.g., liquid water and hydrogen sulfide gas) or substances which may be readily resolved into separate phases after the desired exchange reaction has taken place (e.g., water vapor of steam and hydrogen gas).

As above stated the two or more substances selected for the isotope exchange should have distinct phases which are separate from each other, or in the case of two or more fluids where only a single phase may be present during at least a portion of the reaction, they should be readily separable from each other. The substances selected may comprise a liquid and a gas, as described, or they may comprise two liquids, two gases, a solid and a liquid or even a solid and a gas. In other words, of the various substances which may be employed in the practice of the present invention at least one should be present in the reaction zone in fluid form. It is only necessary that the substances used be capable of an isotope exchange of the nature described herein, that the substances be present in separate phases or at least be physically separable from each other, and that they be contacted at two materially different temperatures.

As examples of isotopes which may be concentrated in accordance with this invention by a method which includes isotopic exchange at different temperature stages as above described, the following may be named:

1. Deuterium
2. Sulfur having an atomic weight of 34
3. Oxygen having an atomic weight of 18
4. Chlorine having an atomic weight of 37
5. Carbon having an atomic weight of 13
6. Nitrogen having an atomic weight of 15

Although many other examples of isotopes and exchange substances might be given, it is believed the above species clearly indicate the wide scope and general applicability of the process of this invention.

It will be understood that the terms "substance" and "material" are employed interchangeably in the specification and claims to designate given elements or compounds generically, whether or not associated with other elements or compounds, unless indicated otherwise by the context.

This invention provides a practical and high efficient system for producing a substance (herein exemplified by water) containing a first material (herein exemplified by (D) deuterium) concentrated therein, by exchanging, at two different temperatures, said first material (exemplified by D) with a second material (exemplified by H) between chemically different fluid substances (exemplified by hydrogen sulfide and water) which are physically separable from each other, and which are each capable of containing each of said materials (D and H).

While there have been described herein what are at present considered preferred embodiments of the invention, it will be obvious to those skilled in the art that modifications, including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be described and included therein.

I claim:

1. In a method for producing a fluid phase containing a first material concentrated therein, by exchanging at different temperatures said first material with a second material between chemically different first and second fluid phases which are physically separable from each other and which are each capable of containing each of said materials, said materials being isotopic, said method being of the type in which
   a. said second fluid phase is passed through each of second and first units, in that order, of a pair of exchange units,
   b. said first fluid phase is caused to flow in countercurrent contact with said second fluid phase in each of said first and second units of said pair,
   c. said first and second units are maintained at different temperatures to cause: (1) said second fluid phase to become progressively enriched in said first material in said second unit, and to become progressively impoverished in said first material in said first unit of said pair: and (2) said first fluid phase to become progressively enriched in said first material in said first unit and to become progressively impoverished in said first material in said second unit of said pair of units, and
   d. enriched fluid passing between said units is withdrawn, the improvement which comprises:
   e. increasing, in a part of said second unit, the proportionate amount of first fluid phase in contact with the second fluid phase after said second fluid phase has reached an increased level of enrichment of said first material therein, while
   f. decreasing, in a part of said first unit, the proportionate amount of first fluid phase in contact with the second fluid phase after said second fluid phase has reached an increased level of impoverishment of said first material therein.

2. A method as claimed in claim 1, wherein the first fluid phase in contact with the second fluid phase which has reached said increased level of enrichment in step (e) and the first fluid phase in contact with the second fluid phase which has reached said increased level of impoverishment in step (f) contain substantially the same concentration of said first material.

3. A method as claimed in claim 2, wherein step (e) is carried out by: (e-1) withdrawing from said second unit a part of the first fluid phase in contact with the second fluid phase which has reached said increased level of enrichment; and step (f) is carried out by: (f-1) adding to the first fluid phase in said first unit in contact with the second fluid phase which has reached said increased level of impoverishment a further quantity of first fluid phase of substantially the same concentration of said first material as the phase withdrawn in (e-1).

4. A method as claimed in claim 1, wherein step (e) is carried out by: (e-1) withdrawing from said second unit a part of the first fluid phase in contact with the second fluid phase which has reached said increased level of enrichment; and step (f) is carried out by: (f-1) adding to the first fluid phase in said first unit in contact with the second fluid phase which has reached first fluid phase of substantially the same concentration of said first material as the phase withdrawn concentration of said first material as the phase withdrawn in (e-1).

5. A method as claimed in claim 4, wherein the part of the first fluid phase withdrawn in step (e-1) supplies the further quantity of first fluid phase added in step (f-1).

6. A method as claimed in claim 1, wherein steps (e) and (f) are practiced at each of a plurality of levels of enrichment and a plurality of levels of impoverishment, respectively, of said first material in said second fluid phase.

7. In a method for producing a fluid phase containing deuterium concentrated therein, by exchanging at different temperatures deuterium with a second isotope of hydrogen between chemically different first and second fluid phases which are physically separable from each other and which are each capable of containing each of said isotopes, said method being of the type in which
   a. said second fluid phase in gaseous form is passed through each of second and first units, in that order, of a pair of exchange units,
   b. said first fluid phase in liquid form is caused to flow in countercurrent contact with said second fluid phase in each of said first and second units of said pair,
   c. said first and second units are maintained at different temperatures to cause: (1) said second fluid phase to become progressively enriched in deuterium in said second unit, and to become progressively impoverished in deuterium in said first unit of said pair; and (2) said first fluid phase to become progressively enriched in deuterium in said first unit and to become progressively impoverished in deuterium in said second unit of said pair of units, and deuterium enriched fluid passing between said units is withdrawn, the improvement which comprises:
   e. increasing, in a part of said second unit, the proportionate amount of first fluid phase in contact with the second fluid phase after said second fluid phase has reached an increased level of deuterium enrichment therein, while
   f. decreasing, in a part of said first unit, the proportionate amount of first fluid phase in contact with the second fluid phase after said second fluid phase has reached an increased level of deuterium impoverishment therein.

8. In a method as claimed idn claim 7, wherein the first fluid is water, the second fluid is another compound of hydrogen physically separable from said water, and the pair of units referred to in clauses (a) (b) and (c) constitutes a first pair of units; and wherein the improvement further comprises:
g. subjecting the deuterium enriched fluid withdrawn from between the first and second units of said first pair of units to further enrichment of deuterium therein in a second pair of exchange units by the method specified in clauses (a) through (f),
h. supplying, as the liquid water to be enriched in deuterium in the first unit of said pair of units, water having a deuterium content in the range of from 1 to about 15 mol percent as $D_2O$,
i. in said first and second pairs of units, practising the improvements referred to in steps (e) and (f) to a sufficient extent to produce a more highly deutrium enriched water passing between the units of said second pair of units having a desired concentration of deuterium of up to 99.8 mol percent as $D_2O$,
j. withdrawing part of said more highly deutrium enriched water from between the units of said second pair of units.

9. An improved method as claimed in claim 8, the method being one in which the second fluid is a gas partially soluble in water, and in which the more highly enriched water withdrawn from between the first and second units of the second pair of units is a heated flow which contains dissolved second fluid and may also contain dissolved non-volatile components; and wherein the impoyement further comprises:
k. passing the withdrawn more highly deutrium enriched water in countercurrent contact with a flow of vapor thereof, whereby the said dissolved second fluid is transferred to the gaseous phase and a portion of said water vapor is condensed into said flow of more highly enriched water,
l. evaporating a part of the said flow of more highly deutrium enriched water containing said condensate to form deutrium enriched water vapor and leave a liquid remainder of said water flow,
m. dividing the deutrium enriched water vapor produced by step (1) into two flows, one of which is withdrawn to a product vapor stream, and the other of which constitutes the flow of vapor referred to in step (k),
n. returning the gaseous phase resulting from step (K) to the flow of second fluid to be impoverished in the first unit of said second pair of units, and
o. returning the liquid remainder of said water flow resulting from step (1) to the flow of first fluid to be impoverished in the second unit of said second pair of units.

10. An improved method as claimed in claim 9, wherein:
p. the product vapor stream withdrawn in step (m) is condensed and in part withdrawn as distilled liquid and in part recycled to the evaporation of step (1).

11. An improved method as claimed in claim 10, wherein:
q. the part of the distilled liquid formed in step (p) which is withdrawn is further treated by evaporation to vapor and partial condensation under reflux backwashing of the vapor of the condensate therefrom, with withdrawal of a part of the so backwashed vapor, and with
r. condensation of the vapor withdrawn in step (q) to form the final deutrium enriched product.

12. An improved method as claimed in claim 11, wherein potassium permanganate is added to the distilled liquid being evaporated in step (q) to oxidize any oxidizable contaminants therein which might otherwise be evaporated in step (q).

13. A method as claimed in claim 7, wherein, the first fluid is water having a deutrium content of at least 1 mol percent as $D_2O$, the second fluid is another compound of hydrogen physically separable from said water, the exchange reactions which effect transfer of deutrium between the second fluid and the water are exothermic in the first unit and endothermic in the second unit, and the improvement further comprises:
g. removing from the fluids in the first unit, at or at least one intermediate deutrium enrichment level therein, sensible heat imparted thereto by said exothermic reaction, and
h. adding heat to the fluids in the second unit, at at least one intermediate deutrium enrichment level therein, to replace sensible heat extracted therefrom by said endothermic reaction.

* * * * *